(12) United States Patent
Royt (10) Patent No.: US 9,884,581 B1
(45) Date of Patent: Feb. 6, 2018

(54) ADJUSTABLE LEVER LOAD BINDER

(71) Applicant: Peck & Hale, L.L.C., West Sayville, NY (US)

(72) Inventor: Joseph Royt, Fresh Meadows, NY (US)

(73) Assignee: Peck & Hale, L.L.C., West Sayville, NY (US)

( * ) Notice: Subject to any disclaimer, the term of this patent is extended or adjusted under 35 U.S.C. 154(b) by 0 days.

(21) Appl. No.: 15/473,695

(22) Filed: Mar. 30, 2017

Related U.S. Application Data (60) Provisional application No. 62/315,616, filed on Mar. 30, 2016.

(51) Int. Cl.
*B60P 7/08* (2006.01)

(52) U.S. Cl.
CPC ......... *B60P 7/0838* (2013.01); *Y10T 24/2175* (2015.01); *Y10T 24/2177* (2015.01)

(58) Field of Classification Search
CPC .. B60P 7/06; B60P 7/08; B60P 7/0838; Y10T 24/2175; Y10T 24/2177
See application file for complete search history.

(56) References Cited

U.S. PATENT DOCUMENTS

| | | |
|---|---|---|
| 2,824,717 A | 2/1958 | Yeager |
| 3,271,007 A | 9/1966 | Ratcliff |
| 3,591,141 A | 7/1971 | Ratcliff |
| 4,136,494 A | 1/1979 | Jameson |
| 4,422,218 A | 12/1983 | Brasseux |
| 4,500,073 A | 2/1985 | Smith |
| 4,606,096 A | 8/1986 | Wood |
| 4,977,646 A | 12/1990 | McCraw |
| 5,429,462 A | 7/1995 | Anderson |
| 6,141,836 A | 11/2000 | Thornton |
| 6,425,339 B1 | 7/2002 | Furlong |
| 6,477,747 B1 | 11/2002 | Flagg |
| 7,065,840 B2 | 6/2006 | Profit |
| 7,913,363 B2 | 3/2011 | Scott |
| 8,491,237 B2 | 7/2013 | Parkinson |
| 8,668,417 B2 | 3/2014 | Harrigan |
| 9,102,259 B2 | 8/2015 | Brewster |
| 9,242,592 B1 | 1/2016 | Meszaros |

*Primary Examiner* — Abigail Troy
(74) *Attorney, Agent, or Firm* — Schroeder Law PC (57) ABSTRACT

A lever load binder which provides fine adjustments for accommodation of the length of the tiedown chain without twisting of the tiedown chain or binder, increased efficiency of use, and improved safety.

18 Claims, 6 Drawing Sheets

Section n C-C from Figure 2

Figure 1

Figure 2
View A from Figure 1

Figure 3
View B from Figure 2

Figure 4
Section n C-C from Figure 2

Figure 5
SECTION C-C from Figure 2 in
Released Condition

Figure 6
Detail D of Figure 4

Figure 7
Detail E of figure 5

Figure 8
Detail F of Figure 1

ADJUSTABLE LEVER LOAD BINDER

This application claims the benefit of U.S. Provisional Application Ser. No. 62/315,616, filed Mar. 30, 2016.

BACKGROUND OF THE INVENTION

The present invention relates to adjustable lever load binders which are used to tension a length of chain securing a load during transportation.

The prior art includes various devices which are used for securing heavy cargo that has been loaded on open top railcars, trailers, and containers. The term "open top" refers to freight cars, intermodal trailers, and containers that are not enclosed—and thus potentially expose the cargo to the environment. Vehicles in this category include various types of flat cars, gondola cars, hopper cars, flatbed trailers, flat rack containers, among others.

Chain tiedown assemblies are often used to secure heavy cargo in all three directions—longitudinal, lateral, and vertical. To ensure that the load does not move or shift, restraint values must be observed per the rules utilized in that particular transportation industry. For example, typical restraint requirements for rail road transportation are: longitudinal direction—three times the weight from each side of the load; lateral direction—two times the weight from each side of the load; and vertical direction—two times the weight.

The prior art includes three types of load binders for use in securement of open top loads—ratchet type, turnbuckle type, and lever type. As will be recognized by those skilled in the art, ratchet type binders, such as the device disclosed in U.S. Pat. No. 9,102,259, are i) adapted to adjust a preliminary tension within small intervals defined by the pitch of a ratchet gear; ii) are the most expensive; and iii) are not well-suited for harsh environments. Turnbuckle type binders, such as the device disclosed in U.S. Pat. No. 8,491,237, are i) adapted to adjust force continuously without any intervals; ii) but require extra operational space for handle rotation in the plane perpendicular to the line of tension; and iii) also are not well-suited for harsh environments. Finally, lever type adjustable binders are i) adapted to operate in harsh environments; and ii) are preferred in applications wherein there is limited time for loading/unloading.

Lever load binders are typically used in tie-down applications for heavy equipment. The transport of heavy equipment, such as military, construction or other like equipment, is frequently accomplished over rails, on trucks, and/or on ships and barges. The heavy equipment is typically tied down to a flat bed of the vehicle so that the cargo does not move or oscillate during transport thereof.

Although the prior art has provided various improved designs of adjustable lever load binders (e.g., U.S. Pat. No. 7,913,363), and although each new design has provided certain additional benefits, today's adjustable lever load binders still have certain drawbacks. First, many prior art lever load binders lack the capability to readily make fine adjustments for accommodation of the length of the tiedown chain. As will be understood by those skilled in the art, it is often necessary to couple and decouple the tiedown chain from the lever load binder during cargo securement to determine the appropriate link of the tiedown chain for engagement with the binder. More particularly, if the tiedown chain is too tight, then the locking of the lever load binder may over stress the components of the tiedown assembly. If the tiedown chain is too loose, then the locking of lever load binder may not remove all of the slack from the tiedown chain. Thus, the mentioned installation process can be a time-consuming and intricate procedure. Often times, the necessary adjustment length to ensure proper loading is equal to or less than the length of a link of the tiedown chain. Because the orientation of the lever load binder is substantially fixed due to the connection of such binder to the transportation vehicle, it is generally necessary to adjust the length of the tiedown chain in increments of two links. In other words, because the adjacent links of the chain are oriented 90° from one another, attempting to adjusts the length of the tiedown chain by a single link can result in the twisting of the tiedown chain or of the lever load binder. Of course, any twisting of components in the tiedown assembly is undesirable, and should be avoided. Second, typical prior art lever load binders are designed as "over center binders". The lever of an over center binder, when in the locked position, is located over a lever pivot point or a line of tension. Although the location of the lever at this position generates additional locking torque, it also requires the operator to overcome this additional torque (in addition to the friction resistance force) when rotating the lever in the opposite direction during release. Third, over center binders are more likely to experience handle kickback as the handle moves from the over center locked position through the tension line. Fourth, prior art lever load binders typically have a constant geometrical proportion between the length of the lever used to apply the locking force and the internal point where the force is delivered to tension the chain. In such a design, the amount of force required during the final moment of locking is significantly greater than the force expended up until that point because of the two shoulder design.

There is therefore a need in the art for a lever load binder which provides fine adjustments for accommodation of the length of the tiedown chain, and does so in a time sensitive manner and without twisting of the tiedown chain or lever load binder. There is a further need in the art for a lever load binder which increases the efficiency and safety of using the device.

SUMMARY OF THE INVENTION

The present invention, which addresses the needs of the prior art, relates to an adjustable lever load binder for securing cargo during transportation. The binder includes a first attachment assembly for receiving and retaining a first section of chain, the first attachment assembly including: i) a clevis-shaped body having first and second ends; ii) a handle pivotably attached to the first end of the body about an axis H and movable between a released position wherein the first section of chain is untensioned and a closed position wherein the first section of chain is tensioned, the handle including a cam; and iii) a chain-receiving jaw attached to the second end of said body. The binder further includes a second attachment assembly for connecting to a securing point, the second attachment assembly including: i) a latching arm defined by opposing side walls, the latching arm having first and second ends; ii) a securing device attached to the first end of the latching arm; iii) a cam follower positioned at the second end of the latching arm for engaging the cam, the cam follower defining an axis F. The handle is sized and configured to extend between the opposing side walls of the latching arm such that the cam located on the handle engages the cam follower as the handle is moved from the released position to the closed position. The first section of chain and the securing device define a line of tension T. The axis H and the axis F remain on the line of tension T throughout movement of the handle from the released position to the closed position and throughout movement of the handle from the closed position to the released position.

In one preferred embodiment, the present invention provides a binder having a jaw which is rotatably attached to the body whereby the jaw can be rotated to selected positions to remove twisting in the first section of chain. In another preferred embodiment, the present invention provides a binder having an adjustment nut connected between the body and the jaw for providing fine adjustment of the tension in the first section of chain.

As a result, the present invention provides a lever load binder which provides fine adjustments for accommodation of the length of the tiedown chain, and does so in a time sensitive manner and without twisting of the tiedown chain or lever load binder. The present invention further provides a lever load binder which increases the efficiency and safety of using the device.

DETAILED DESCRIPTION OF THE INVENTION

It is been discovered herein that the incorporation of a rotating jaw for receipt of the tiedown chain addresses the difficulty that arises when the required length of adjustment is approximately one chain link. The novel jaw of the present invention allows the tiedown chain to be readily adjusted by one chain link without introducing twisting into the tiedown chain or lever load binder. More particularly, the jaw of the present invention is capable of rotating (e.g., 90°), thereby accommodating the orientation of the adjacent link without twisting of the tiedown chain or lever load binder. In one preferred embodiment, the novel jaw includes a locking pin for securing the jaw in the selected orientation.

It has also been discovered herein that the incorporation of a compression spring and an adjustment nut within the lever load binder automatically compensates for small adjustments in length. Together, the rotating jaw, adjustment nut and compression spring of the present invention allow the lever load binder to be quickly and properly installed with reduced/eliminated risk of twisting of the components of the tiedown assembly.

It has further been discovered herein that the incorporation of a cam/follower arrangement into the design of the handle and body, together with the location of the cam and follower along the line of tension created by the secured cargo, provides a lever load binder with increased efficiency of use and safety for the operator.

Figure 1:
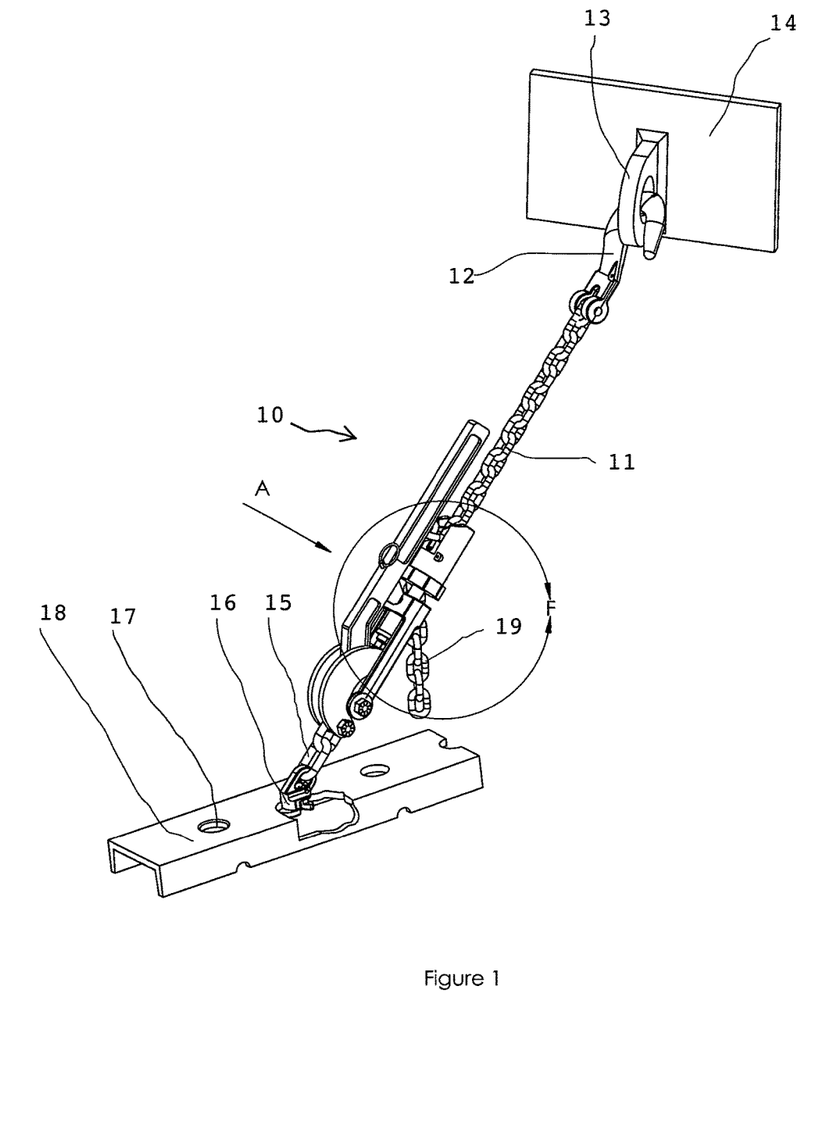
FIG. 1 is a perspective view of an adjustable lever load binder of the present invention in a secured condition.
Figures 1, 2:
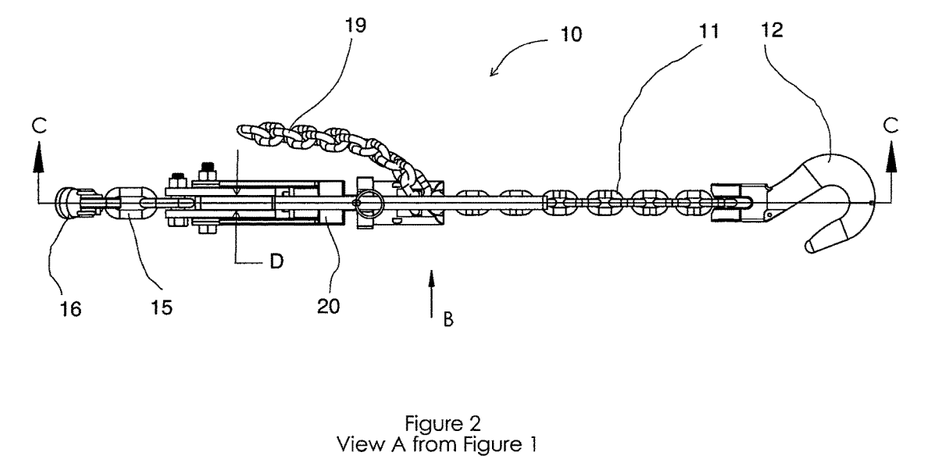
FIG. 2 is a top view of the binder of FIG. 1.
Figures 2, 3:
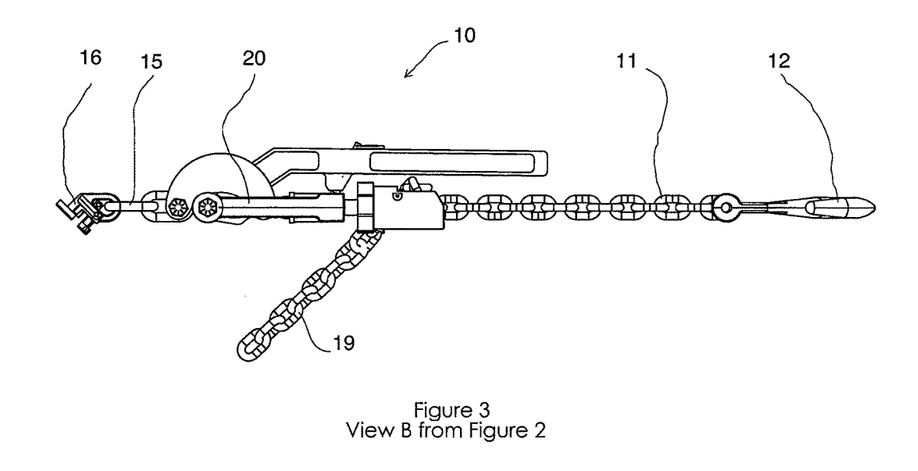
FIG. 3 is a view taken along arrow B of FIG. 2.

An adjustable lever load binder 10 formed in accordance with the present invention is shown in FIGS. 1-8. Binder 10 may be attached to a chain 11 having a hook 12 secured to the opposing end. In turn, hook 12 may be coupled to element 13 of a piece of heavy equipment 14. In one preferred embodiment, the opposite side of binder 10 includes a fixed length of a chain 15 and an anchor 16. In one application, anchor 16 is configured to be secured to an opening 17 formed in a deck 18 of a transportation vehicle. An excess length of chain 19 may extend from binder 10. Of course, anchor 16 can be replaced with a hook or other known securing device. It will be appreciated that the arrangement illustrated in FIG. 1 is simply one example of how binder 10 can be used to secure cargo.

Figure 4:
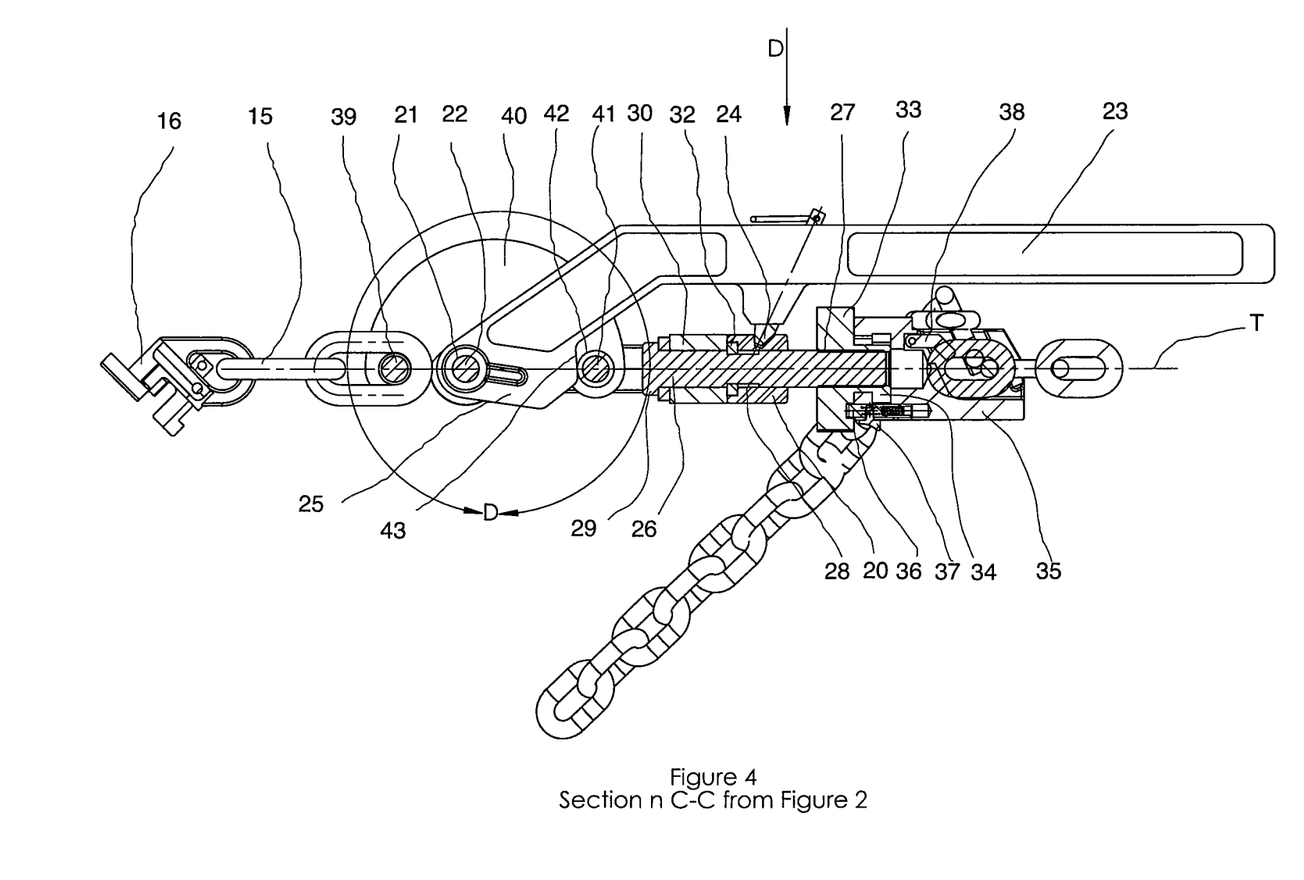
FIG. 4 is an enlarged cross-sectional view taken along lines C-C of FIG. 2 showing the binder in a locked position.

Referring now to FIG. 4, binder 10 includes a clevis-type body 20 with holes 21 extending in a direction perpendicular to the tension force. A bolt 22 is inserted through holes 21, and pivotably secures a handle 23 thereto. Bolt 22 defines an axis H. Handle 23 preferably includes a spring-loaded lock 24 for preventing accidental release of binder 10 during transportation. Handle 23 further includes a three-sectioned cam 25 located parallel to the axis of bolt 22. Body 20 preferably includes a bearing (not shown) to slidably support shaft 26 along the line of tension T. Shaft 26 includes a threaded end 27, a groove 28, and a head 29. A tubular compression spring 30 circumferentially surrounds a portion of shaft 26. At least one retaining element, e.g., a set of half-washers 31, is inserted in cavity 32 of body 20, and positioned to engage groove 28 of shaft 26. Spring 30 is preferably assembled under a small compression force. The length of groove 28 is preferably equal to or shorter in length than the length of the full deflection of spring 30. Binder 10 further includes a threaded adjustment nut 33 having teeth 34. Teeth 34 are sized and located to rotatably secure a jaw 35 thereto. Jaw 35 is configured to engage and retain two links of chain 11, one of them longitudinally oriented, the other being located in a perpendicular plane with some angle to the line of tension T. The angular position of jaw 35 may be adjusted by rotation around the line of tension T to prevent link twisting of the chain 11. A spring-loaded pin 36 slides in a hole of jaw 35 to prevent inadvertent rotation of jaw 35 in the direction of tension force reduction. A button 37 is provided to break the connection between pin 36 and nut 33, thus allowing the tension to be increased or reduced. A spring-loaded lever 38 may be included to help retain chain 11 within the slot of jaw 35.

Binder 10 further includes a latching arm formed from a set of spaced-apart opposing side walls 40 which are connected on one end by a bolt 39. Bolt 39 connects the two side walls to one another at a fixed distance D, while also securing the latching arm to chain 15. Bolt 39 defines an axis S. The other end of side walls 40 are connected together by a bolt 41. Bolt 41 defines an axis F. A cam roller 42 is concentrically-positioned about bolt 41, and sized and located to contact cam 25 located on handle 23. In one preferred embodiment, side walls 40 are formed with an arc-shaped configuration. In another preferred embodiment, the latching arm, together with chain 15 and anchor 16, is a separable assembly from body 20.

Figure 5:
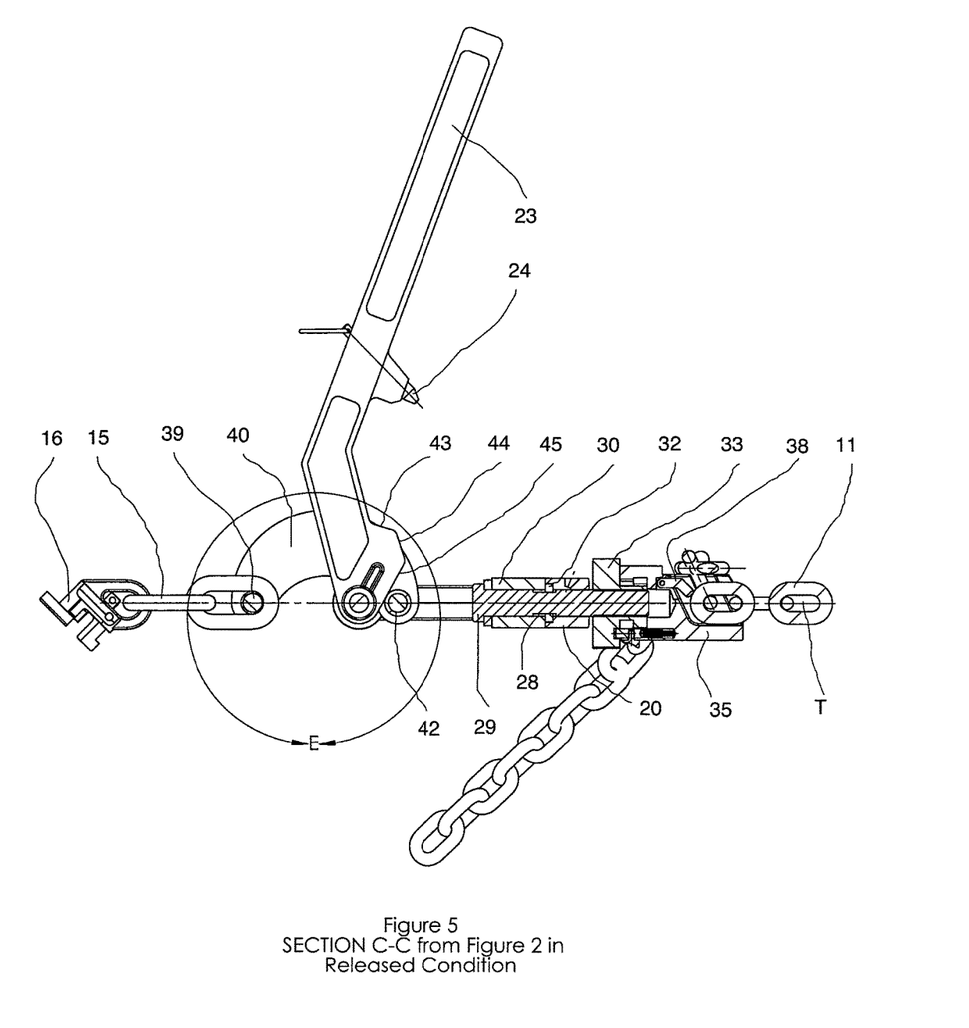
FIG. 5 is an enlarged cross-sectional view taken along lines C-C of FIG. 2 showing the binder in a released position.

FIG. 5 is a view similar to FIG. 4, but with binder 10 in a released condition. As mentioned, the profile of cam 25 includes three contact areas to engage follower 42. These three contact areas include: i) contact area 43 which provides the final locking step and which prevents handle 23 from inadvertent release; ii) contact area 44 which causes deflection of spring 30; and iii) contact area 45 which eliminates any chain slack at the beginning of the locking action.

Figures 4, 6:
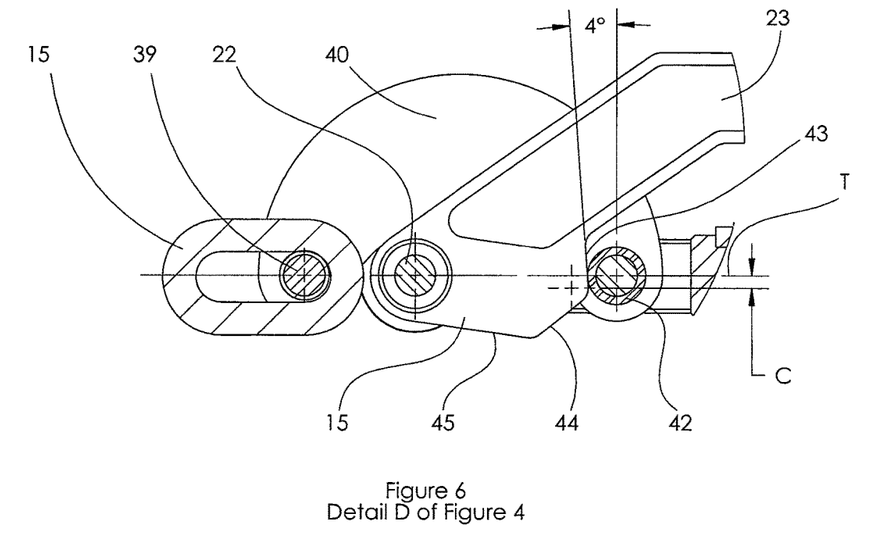
FIG. 6 is an enlarged detail taken from FIG. 4.

FIG. 6 shows in detail the contact between follower 42 and contact area 43 of cam 25 when the binder is in the locked position. Because the centers of bolt 39, bolt 22, and follower 42 are all located along the line of tension T, it is not necessary to provide a specific torque moment to prevent inadvertent rotation of handle 23 to the released condition. In one preferred embodiment, contact area 43 forms an angle β with respect to axis X, which passes through the center of follower 42 and is perpendicular to line of tension T. Angle β is preferably on the order of approximately 4°—which reduces risk of inadvertent release. Contact area 44 is preferably located a distance C below line of tension T—which further reduces risk of inadvertent release.

Figures 5, 7:
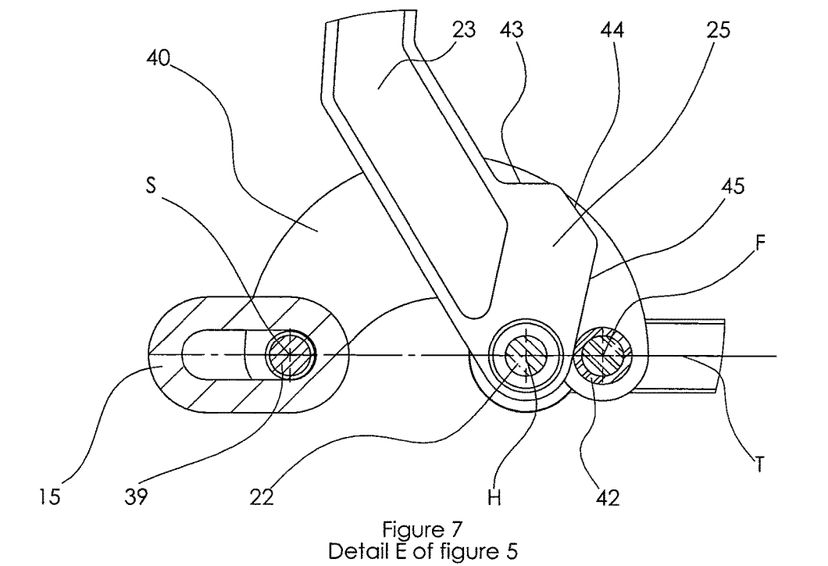
FIG. 7 is an enlarged detail taken from FIG. 5.

FIG. 7 shows in detail the contact between follower 42 and contact area 45 of cam 25 when the binder is in the released condition. The centers of bolt 39, bolt 22, and follower 42 remain on the line of tension T, while the tension force decreases to zero or substantially zero.

Figure 8:
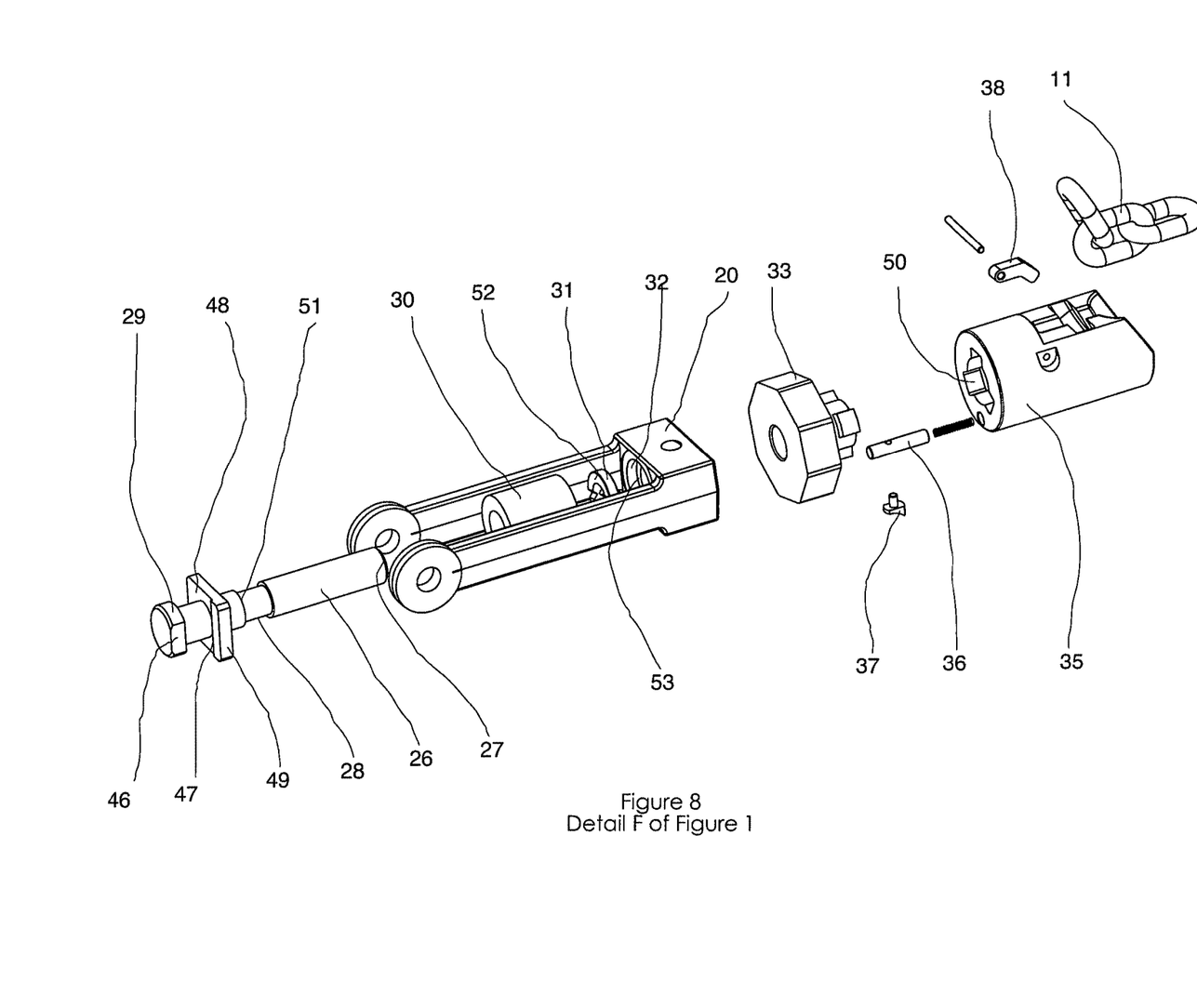
FIG. 8 is an enlarged exploded perspective taken from FIG. 1.

Referring now to FIG. 8, head 29 of threaded shaft 26 includes a flat area 46 tangent to a similar flat surface 47 of a square washer 48. The side walls 49 of washer 48 contact the interior wall of body 20, thus preventing any rotation of washer 48, and likewise, any rotation of shaft 26 about the line of tension during rotation of nut 33 and/or jaw 35. In one preferred embodiment, teeth 34 of nut 33 engage slots 50 of jaw 35. Groove 28 allows for shaft 26 to travel along the line of tension T, when spring 30 compressed or released. When spring 30 is fully compressed, a shoulder 51 of groove 28 contacts a surface 52 of ring 32, which in turn contacts surface 53 of body 20—thus forming a hard stop against any further translation of shaft 26—and thus preventing any further compression of spring 30.

The process of securing cargo using load binder 10 will now be explained. The operator will start with binder 10 in a released position, as shown in FIG. 5. The operator will secure anchor 16 to the deck of the vehicle, and will then secure hook 12 to an available element 13 of the cargo. The operator will then need to select a suitable length of chain 11 and insert two links of the chain into the slots of jaw 35. Spring loaded lever 38 helps to retain the links within the slots of jaw 35. The operator then rotates handle 23 in a clockwise direction. Initially, area 45 of cam 25 is in contact with follower 42. This initial rotation of handle 23 eliminates any existing slack in the whole system. During this initial stage of rotation, the resistance experienced by the operator is minimal. As the slack is eliminated, follower 42 begins to contact area 44 of cam 25. During this second stage of rotation, a force is transmitted to spring 30—thus compressing spring 30. In the final and third stage of rotation, follower 42 contacts area 43 of cam 25. As discussed herein, follower 42 always remains on the line of tension T. Even with handle 23 is in locked position, the operator can still address and eliminate any chain twisting by rotation of jaw 35, separately or together with adjustment nut 33.

During transportation, the inertial forces applied to the cargo can periodically increase the tension forces in the binder. In these instances, spring 30 may be compressed until shaft 26 engages the hard stop formed between ring 32, groove 128 and body 20. In one preferred embodiment, the allowed full deflection of spring 30 is equal to or slightly greater than the chain pitch.

When the operator needs to release the secured cargo, lock 24 is released and handle 23 is rotated counterclockwise. As discussed, follower 42 remains on the line of tension T, and the resultant of all internal forces applied to handle 23 will be 0—as it is during locking process. As a result, the operator is not required to apply extra force during rotation of handle 23. In addition, the operator will not experience any sudden forces as the handle is rotated counterclockwise—thus eliminating the risk of kickback and operator injury.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. An adjustable lever load binder for securing cargo during transportation, comprising:
    a) a first attachment assembly for receiving and retaining a first section of chain, said first attachment assembly including:
        i) a clevis-shaped body having first and second ends;
        ii) a handle pivotably attached to said first end of said body about an axis H and movable between a released position wherein said first section of chain is untensioned and a closed position wherein said first section of chain is tensioned, said handle including a cam;
        iii) a chain-receiving jaw attached to said second end of said body; and
    b) a second attachment assembly for connecting to a securing point, said second attachment assembly including:
        i) a latching arm defined by opposing side walls spaced apart a distance D, said latching arm having first and second ends;
        ii) a securing device attached to said first end of said latching arm;
        iii) a cam follower positioned at said second end of said latching arm for engaging said cam, said cam follower defining an axis F; and
    and wherein said handle is sized and configured to extend between said opposing side walls of said latching arm such that said cam located on said handle engages said cam follower as said handle is moved from said released position to said closed position; and
    wherein said first section of chain and said securing device define a line of tension T, said axis H and said axis F remaining on said line of tension T throughout movement of said handle from said released position to said closed position and throughout movement of said handle from said closed position to said released position.

2. The binder according to claim 1, wherein said jaw is rotatably attached to said body whereby said jaw can be rotated to selected positions to remove twisting in said first section of chain.

3. The binder according to claim 2, further comprising an adjustment nut connected between said body and said jaw for providing fine adjustment of the tension in said first section of chain.

4. The binder according to claim 3, further comprising:
    a spring-loaded pin for coupling said jaw to said adjustment nut; and
    a button communicating with said pin for uncoupling said jaw from said adjustment nut.

5. The binder according to claim 4, wherein said jaw is rotatable between four selected positions positioned at 90° intervals.

6. The binder according to claim 4, wherein said adjustment nut includes a plurality of teeth for rotatably coupling said jaw thereto.

7. The binder according to claim 2, wherein said first attachment assembly further includes:
- a shaft slidably supported by said body, said shaft having a first end, a second end and a groove located therebetween, said first end of said shaft defining an enlarged head, said second end of said shaft being threaded;
- at least one retaining element sized to engage said groove, said body defining a cavity sized to receive said shaft and said retaining element whereby said shaft is slidable between a first position and a second position;
- a tubular compression spring circumferentially surrounding said shaft and positioned between said head of said shaft and an outer edge defining said cavity, one end of said compression spring contacting both said outer edge and said retaining element.

8. The binder according to claim 7, wherein said handle includes a first cam surface, a second cam surface and a third cam surface, and wherein said first cam surface is configured to eliminate slack in said first section of chain during the initial movement of said handle from said released position to said closed position, and wherein said second cam surface is configured to cause deflection of said compression spring, and wherein said third cam surface is configured to lock said handle in said closed position.

9. The binder according to claim 8, wherein said retaining element include a set of half washers.

10. The binder according to claim 9, wherein said first attachment assembly further includes an adjustment nut connected between said body and said jaw, said threaded second end of said shaft being received within said adjustment nut whereby rotation of said adjustment nut causes translation of said shaft to provide fine adjustment of the tension in said first section of chain.

11. The binder according to claim 10, wherein said first attachment assembly further includes a substantially rectangular washer positioned about said shaft near said first end of said shaft, said rectangular washer sized to engage the interior of said body thereby limiting rotation of said shaft in response to rotation of said adjustments nut.

12. The binder according to claim 11, wherein said enlarged head of said shaft includes a portion configured to engage said rectangular washer thereby rotationally fixing said shaft to said rectangular washer, said compression spring extending between said rectangular washer and said retaining element.

13. The binder according to claim 12, wherein said securing device is a second section of chain.

14. The binder according to claim 13, wherein said third cam surface forms an angle $\beta$ with respect to an axis X, said axis X passing through the center of said cam follower and being perpendicular to line of tension T, said angle $\beta$ being on the order of approximately 4°.

15. The binder according to claim 14, wherein said second attachment assembly is separable from said first attachment assembly.

16. The binder according to claim 1, wherein said second attachment assembly further includes first and second bolts, said first bolt securing said sidewalls together at said first end of said latching arm and defining an axis S, said second bolt securing said sidewalls together at said second end of said latching arm, said first and second bolts spacing said sidewalls said distance D from each other, said securing device being attached to said first bolt, said axis S remaining on said line of tension T throughout movement of said handle from said released position to said closed position and throughout movement of said handle from said closed position to said released position.

17. The binder according to claim 16, wherein said cam follower is located between said side walls and concentrically positioned about said second bolt, said cam follower being sized to contact said cam.

18. The binder according to claim 17, wherein said sidewalls of said latching arm have an arc-shaped configuration.

* * * * *